United States Patent [19]

Nakayama et al.

[11] 4,350,870
[45] Sep. 21, 1982

[54] TEMPERATURE SENSOR FOR SHEET-SHAPED HEATING ELEMENT

[75] Inventors: Shigeru Nakayama, Hachioji; Tastuo Takizawa, Sagamihara, both of Japan

[73] Assignee: Olympus Optical Company Ltd., Tokyo, Japan

[21] Appl. No.: 238,999

[22] Filed: Feb. 27, 1981

[51] Int. Cl.³ .............................................. H05B 1/02
[52] U.S. Cl. .............................. 219/216; 174/52 PE; 219/251; 219/505; 338/23
[58] Field of Search ............... 219/216, 241, 251, 501, 219/504, 505; 338/22 R, 23, 25; 174/52 PE

[56] References Cited
U.S. PATENT DOCUMENTS 3,076,083  1/1963  Codichini et al. ................ 219/216
3,221,284  11/1965  Summerer ...................... 219/505 X
3,286,077  11/1966  Radford et al. .................... 219/251
3,417,226  12/1968  Thomiszer ........................ 219/216
3,553,430  1/1971  Ting ............................. 219/505 X
3,600,551  8/1971  Flanagan ......................... 219/216
3,646,577  2/1972  Ernst ............................ 219/505 X
3,794,950  2/1974  Kilner ............................. 338/23

Primary Examiner—Volodymyr Y. Mayewsky
Attorney, Agent, or Firm—Weinstein & Sutton

[57] ABSTRACT

A temperature sensor for a sheet-shaped heating element includes a thermistor which is fixedly mounted in a mounting aperture formed in a sheet-shaped heating element. The thermistor is disposed in the mounting aperture so that lead wires within the envelope of the thermistor extend normal to the plane of the heating element.

11 Claims, 8 Drawing Figures

TEMPERATURE SENSOR FOR SHEET-SHAPED HEATING ELEMENT

BACKGROUND OF THE INVENTION

The invention relates to a temperature sensor for a sheet-shaped heating element, and more particularly, to a temperature sensor which may be used, for example, in an electrophotographic copying machine including a heater to fix a toner image transferred onto a record paper by heating it and in which the operating temperature of a sheet-shaped heating element used in the heater is determined by means of a thermistor.

In determining the temperature of a sheet-shaped heating element which is used in a heat fixing unit for an electrophotographic copying machine, a thermistor may be used as illustrated in FIG. 1. As is well recognized, a thermistor 1 comprises a heat sensitive element 1b which is disposed within an envelope 1a, formed of a material such as glass or heat resistant plastic, toward the lower end thereof, and a pair of lead wires 3 having their one end connected to the element 1b at spaced points and having their other end taken out of the envelope through the top end thereof. When used as a temperature sensor, the thermistor 1 is disposed so that its lower end is in contact with the surface of a sheet-shaped heating element 2, as illustrated. However, when the thermistor 1 is disposed in this manner, it is difficult to provide an accurate determination of the temperature of the heating element 2 since a mere contact of the free end of the thermistor with the sheet-shaped heating element 2 is unstable and causes a variation in the spacing between the heat sensitive element 1b and the heating element 2. In extreme cases, the heat sensitive element 1b may be spaced from the heating element 2 due to oscillations of a heater, making it impossible to provide an arcuate determination and control of the temperature.

To avoid the above difficulty, FIG. 2 illustrates thermistor 1 which has an ellipsoidal configuration so that it may be disposed in lengthwise contact with the sheet-shaped heating element 2, as shown. While this arrangement provides a more arcuate determination of the temperature as compared with the arrangement of FIG. 1 because the heat sensitive element 1b is located close to the heating element 2, it still suffers from the disadvantages that the thermistor may move away from the heating element due to oscillations of the heater. In addition, because the lead wires 3 are located close to the heating element 2, there occurs a problem of leakage between the lead wires, causing a likelihood that an error in the measurement may be produced.

SUMMARY OF THE INVENTION

In view of the foregoing, it is an object of the invention to provide a temperature sensor for a sheet-shaped heating element which avoids the above disadvantages by providing a mounting aperture in a sheet-shaped heating element for fixing a thermistor therein, and mounting the thermistor in the aperture in a manner such that lead wires contained in an envelope of the thermistor extend normal to the plane of the sheet-shaped heating element.

In accordance with the invention, since the thermistor is disposed in a mounting aperture formed in the sheet-shaped heating element, the heat sensitive element of the thermistor is disposed closer to the sheet-shaped heating element as compared with the prior art, assuring a more accurate determination of the temperature of the heating element.

In addition, the thermistor is tightly fitted into or secured in the mounting aperture, so that any application of oscillations which a heater to cause a flexure of the sheet-shaped heating element cannot cause a movement of the thermistor away from the latter.

DESCRIPTION OF PREFERRED EMBODIMENTS

Figure 1:
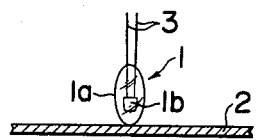
FIGS. 1 and 2 are schematic views illustrating examples of prior temperatures sensors for a sheet-shaped heating element.
Figure 2:
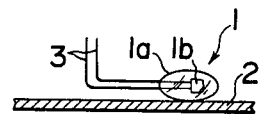
Figure 3:
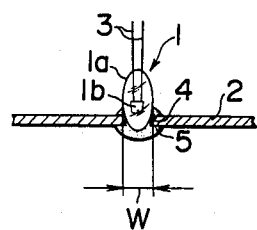
FIG. 3 is a schematic view of a temperature sensor for a sheet-shaped heating element according to one embodiment of the invention.

Referring to FIG. 3, there is shown a temperature sensor for a sheet-shaped heating element according to one embodiment of the invention. In this embodiment, a thermistor 1 is shown as a barrel configuration having a maximum diameter W, and is disposed to extend lengthwise into an aperture 4 formed in a sheet-shaped heating element 2, the aperture 4 having a diameter which is slightly less than the maximum diameter W of the thermistor 1. The thermistor 1 is disposed so that its lower end extends normal to the plane of the heating element 2. It will be understood that the relative position of the thermistor 1 depends on a difference between the maximum diameter W of the thermistor 1 and the diameter of the aperture 4. When the thermistor 1 is mounted in the heating element 2 in this manner, it will be apparent from the drawing that the heat sensitive element 1b of the thermistor 1 is located close to the heating element 2, thus permitting an accurate determination of the operating temperature of the heating element 2. Since the free end of the thermistor 1 is tightly inserted into the aperture 4, any oscillation of a heater cannot cause a separation therebetween. When the thermistor 1 is mounted on the heating element 2 as shown, they are fixed together by utilizing heat resistant adhesive 5 such as Aron ceramic D (manufactured by Toa Gosei Chemical) or Sumi Ceram S-202 (manufactured by Sumitomo Chemical).

Figure 4:
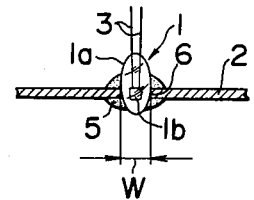
FIGS. 4 and 5 are schematic views of other embodiments of the invention.

In the embodiment of FIG. 3, the location of the heat sensitive element 1b within an envelope 1a varies from thermistor to thermistor, and it is necessary to adjust the diameter of the aperture 4 in accordance with individual thermistors in order to dispose the heat sensitive element 1b closest to the sheet-shaped heating element 2. However, as a matter of practice, it is impossible to perform such adjustment with individual thermistors. To cope with this problem, the heating element 2 may be formed with an aperture 6 of a diameter which is slightly greater than the maximum diameter W of the thermistor 1 and the thermistor 1 may be secured to the heating element 2 with adhesive 5 when the thermistor has been inserted into the aperture 6 to an extent that the heat sensitive element 1b is located closest to the heating element 2, as shown in FIG. 4.

Figure 5:
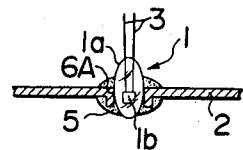

Alternatively, as shown in FIG. 5, the heating element 2 may be worked to produce burrs, and then the thermistor 1 may be inserted into an opening 6A formed by such working and secured therein with adhesive 5. This facilitates placing the thermistor in an upright position and stabilizing it. In addition, a tolerance for relative positioning between the thermistor 1 and the heating element 2 increases, thereby facilitating the mounting of the thermistor 1.

Figure 6:
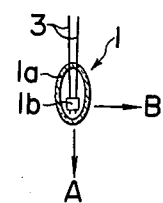
FIG. 6 is a cross section of one form of thermistor.

FIG. 6 illustrates the detail of the thermistor 1 in which the inner ends of the lead wires 3 are connected to the heat sensitive element 1b within the envelope 1a. However, because of a mass production of thermistors, the inner ends of the lead wires 3 may project downwardly beyond the heat sensitive element 1b though remaining within the envelope 1a, with the length of such projection varying from thermistor to thermistor. This leads to the fact that the voltage withstanding capability of the thermistor relative to the sheet-shaped element 2 is improved and more stable in a direction indicated by an arrow B which is perpendicular to the length of the lead wires 3 than in a direction indicated by an arrow A which is the lengthwise direction of the lead wires 3. Consequently, when the thermistor 1 is mounted in an upright position relative to the sheet-shaped heating element 2 as in the temperature sensor of the invention, the voltage withstanding capability between the thermistor 1 and the heating element 2 can be improved.

Figure 7:
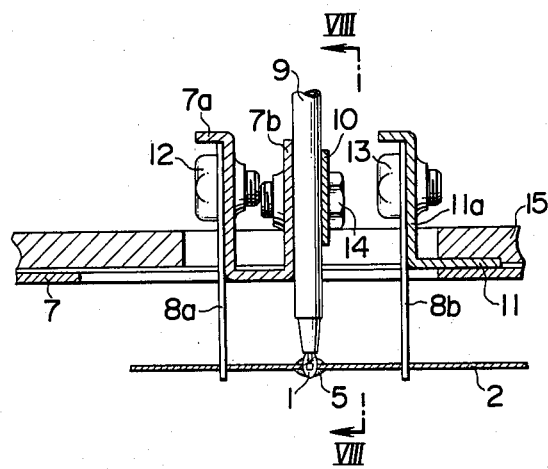
FIG. 7 is a side elevation, partly in section, of a mechanism which supports a sheet-shaped heating element for use with the temperature sensor of the invention.
Figure 8:
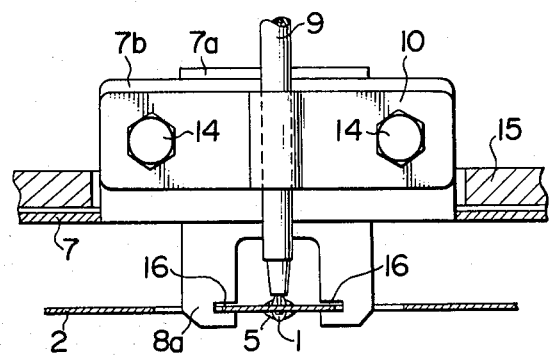
FIG. 8 is a view taken along the line VIII—VIII shown in FIG. 7.

It will be understood that a sheet-shaped heating element such as shown at 2 which is used in a heat fixing unit of an electrophotographic copying machine is generally formed as a very thin sheet, which is therefore susceptible to deflection, giving rise to the likelihood that the thermistor 1 which is mounted in the manner mentioned above may still be disengaged due to the oscillations or shocks. To accommodate for this possibility, a support mechanism may be used for gently holding the sheet-shaped heating element 2 in the vicinity of the thermistor 1, as shown in FIGS. 7 and 8. The support mechanism comprises a pair of heat resistant support plates 8a, 8b, both mounted on a support member 7 which is in turn secured to a stationary member 15, for holding the heating element 2, and a thermistor support sleeve 9 which is mounted on the support member 7 and having the thermistor 1 fixedly mounted on its free end. The support member 7 is originally a plate member, part of which is cut and raised into upright position to define a U-shaped member having a pair of limbs 7a, 7b, one of which 7a, has the upper end of the support plate 8a secured thereto by means of a threaded bolt 12. The thermistor support sleeve 9 is applied against the outer side of the other limb 7b, and is secured in place by a pair of threaded bolts 14 with a keep plate 10 interposed therebetween. The other support plate 8b is fixedly connected, by means of a threaded bolt 13, with an upright portion 11a of an L-shaped support member 11 which is in turn secured to the support member 7. The both support plates 8a, 8b are of an indentical configuration, and its lower end is centrally notched, as shown in FIG. 8, and the opposing inner edges are formed with aligned slits 16 in which part of the sheet-shaped heating element 2 is inserted to be held thereby.

When the sheet-shaped heating element 2 is held by the support sleeve 9 and the support plates 8a, 8b, all of which are secured to the common support member 7, the element 2 is prevented from any unintended movement and deflection, whereby the application of any undue stresses to the area of contact between the thermistor and the heating element is avoided, thus completely eliminating the likelihood that they may become separated from each other. The support plates 8a, 8b may be formed of a refractory silicone glass pane such as KMC310 manufactured by Shinetsu Chemical, for example, exhibiting a reduced heat capacity and heat loss, thus avoiding any adverse influence upon the heating characteristic of the element 2.

In the embodiments described above, the thermistor 1 has been described as presenting an elipsoidal configuration, but is should be understood that the configuration of the thermistor 1 is not limited thereto, but may assume any other configuration such as rod, disc or bead form.

What is claimed is:

1. A controlled heater device comprising an electrical planar heating member and a temperature sensor for determining the operating temperature of said planar heating member by means of a thermistor, comprising:
   a thermistor including a heat sensitive element enclosed within an envelope and having lead wires extending from one end of said envelope, said envelope being heat conductive and electrically insulative;
   said planar heating member having a mounting aperture formed therein;
   said thermistor being disposed within said mounting aperture and adhesively secured by a heat conductive adhesive to said heating member, such that said lead wires are disposed substantially normal to the plane of said planar heating member.

2. A heater device according to claim 1 in which the mounting aperture has a diameter which is slightly greater than the maximum diameter of the thermistor, and said thermistor is secured in the mounting aperture of the planar heating member by a heat conductive adhesive, the thermistor when secured being in a position where said heat sensitive element of the thermistor is in the plane of the planar heating member.

3. A heater device according to claim 1 in which the mounting aperture is formed in the planar heating member with burns.

4. A heater device according to claim 1 wherein part of said envelope protrudes out of said mounting aperture and out of the plane of said planar heating member.

5. A heater device according to claim 1 wherein said heat sensitive element of said thermistor is in the plane of said planar heating member.

6. A heater device according to claim 1 wherein said mounting aperture is formed by protrusions on said heating member, and said heat sensitive element of said thermistor is disposed between said protrusions.

7. A heater device according to claim 1 wherein said mounting aperture has a diameter which is slightly smaller than the maximum diameter of the thermistor, and said thermistor is adhesively secured to said heating member such that said envelope is in direct contact with said heating member.

8. A heater device according to claim 1 wherein said planar heating member is sheet-shaped.

9. A heater device according to claim 1 wherein said mounting aperture is a through-hole formed in said planar heating member.

10. A heater device according to any one of claims 1, 2, 3, 4, 5, 6, 7, 8, or 9 wherein the planar heating member is carried, in the vicinity of the mounting aperture, by a heat resistant support plate which is mounted on a stationary support member, said stationary support member also supporting the thermistor.

11. A heater device according to claim 1 wherein said mounting aperture has a diameter which is slightly greater than the maximum diameter of the thermistor, and said thermistor is adhesively secured to said heating member such that said envelope is in direct contact with said heating member.

* * * * *